United States Patent
Wang et al.

(10) Patent No.: US 11,401,186 B2
(45) Date of Patent: Aug. 2, 2022

(54) URBAN RIVER CHANNEL DIRECT PURIFICATION DEVICE

(71) Applicant: Shanghai Investigation, Design & Research Institute Co., Ltd., Shanghai (CN)

(72) Inventors: Zhaohui Wang, Shanghai (CN); Hao Lu, Shanghai (CN); Xin Zhang, Shanghai (CN); Shaobo Zhu, Shanghai (CN); Xiang Long, Shanghai (CN)

(73) Assignee: Shanghai Investigation, Design & Research Institute Co., Ltd., Shanghai (CN)

( * ) Notice: Subject to any disclaimer, the term of this patent is extended or adjusted under 35 U.S.C. 154(b) by 0 days.

(21) Appl. No.: 17/040,526

(22) PCT Filed: May 24, 2019

(86) PCT No.: PCT/CN2019/088260
§ 371 (c)(1),
(2) Date: Sep. 22, 2020

(87) PCT Pub. No.: WO2020/103415
PCT Pub. Date: May 28, 2020

(65) Prior Publication Data
US 2021/0363040 A1 Nov. 25, 2021

(30) Foreign Application Priority Data
Nov. 23, 2018 (CN) .......................... 201811403701.4

(51) Int. Cl.
*B01D 25/00* (2006.01)
*B01D 25/164* (2006.01)
(Continued)

(52) U.S. Cl.
CPC .............. *C02F 3/32* (2013.01); *B01D 25/164* (2013.01); *B01D 25/215* (2013.01); *C02F 1/283* (2013.01);
(Continued)

(58) Field of Classification Search
CPC .. C02F 3/32; C02F 1/286; C02F 1/283; C02F 2103/007; C02F 1/281; C02F 1/28; C02F 2203/006
(Continued)

(56) References Cited

U.S. PATENT DOCUMENTS 2,198,150 A * 4/1940 Barnhart ................ A01G 31/02
47/62 R
7,514,002 B1 * 4/2009 Betsumori ........... B01J 20/2805
210/660

FOREIGN PATENT DOCUMENTS

CN 105672201 A * 6/2016
CN 210184964 U * 3/2020
(Continued)

*Primary Examiner* — Magali P Slawski
*Assistant Examiner* — Angel Olivera

(57) ABSTRACT

The present disclosure provides an urban river channel direct purification device. The device includes a support wall panel arranged vertically, an upper tray and a lower tray arranged horizontally, an upper end of the support wall panel is connected with the upper tray, a lower end of the support wall panel is connected with the lower tray, the upper tray and the lower tray are respectively semi-circular, several filler biological walls are disposed between the upper tray and the lower tray, a top end of each filler biological wall is fixedly connected with the bottom of the upper tray, a bottom end of each filler biological wall is fixedly connected with the lower tray, and the filler biological wall is arranged along a radial direction of the upper tray/lower tray. The device can purify the water of the river channel through the adsorption material in the device.

4 Claims, 3 Drawing Sheets

(51) Int. Cl.
  *B01D 25/21* (2006.01)
  *C02F 103/00* (2006.01)
  *C02F 3/00* (2006.01)
  *C02F 3/10* (2006.01)
  *C02F 1/28* (2006.01)
  *C02F 3/32* (2006.01)

(52) U.S. Cl.
  CPC .............. *C02F 1/286* (2013.01); *C02F 3/106* (2013.01); *C02F 3/109* (2013.01); *B01D 25/00* (2013.01); *C02F 3/327* (2013.01); *C02F 2003/003* (2013.01); *C02F 2103/001* (2013.01); *C02F 2103/007* (2013.01); *C02F 2203/00* (2013.01)

(58) Field of Classification Search
  USPC .............. 210/107.09, 170.1, 747.5; 248/339; 47/64
  See application file for complete search history.

(56) References Cited

FOREIGN PATENT DOCUMENTS

EP          0609896 A1  *  8/1994  ................ C02F 3/06
JP          2001276861 A  *  10/2001

* cited by examiner

URBAN RIVER CHANNEL DIRECT PURIFICATION DEVICE

CROSS REFERENCE TO RELATED APPLICATION

This is a Sect. 371 National Stage of PCT International Application No. PCT/CN2019/088260, filed on 24 May 2019, which claims priority of a Chinese Patent Application No. 2018114037014 filed on 23 Nov. 2018, the contents of which hereby being incorporated by reference in its entirety for all purposes.

BACKGROUND

Field of Disclosure

The present disclosure relates to a city river channel direct purification technology, in particular, to a city river channel direct purification device.

Description of Related Arts

Although the water pollution of urban river channels has gone through several rounds of pollution control, some of them have only temporarily improved. The pollution situation is still very serious, and it is necessary to purify water in river channels regularly. The water pollution of river channels mainly includes an excess of organic pollutants, and water blackening and stink pollution caused by black liquor and odor generated by too many organic pollutants, insufficient dissolved oxygen, and anaerobic decomposition.

At present, the water quality restoration technologies of contaminated rivers include physical technology, chemical technology, biotechnology, and engineering treatment technology. The physical method includes clearing and dispatching, sediment dredging, river aeration, mechanical algae removal, and other technologies. The chemical method includes chemical fixation, chemical algae removal, and other methods. The biotechnology includes aquatic plant purification technology and microbial remediation technology, etc. The engineering treatment technology includes constructed wetland technology, biological floating bed technology, and filler biological bed technology, etc.

The river channel is an open water environment. Even after thorough sewage interception and dredging, runoff on the land surface will still bring organic pollutants from the land surface into the water. Over time, organic sludge would re-accumulate in the river channel, and the water pollution is inevitable. Therefore, sewage interception and dredging cannot solve the problem once and for all. Even if the river channel is dredged, it is only effective for the first time. Due to the inevitable inflow of organic pollutants, water pollution will still recur.

Existing river channels have been seriously polluted, and the pollution will still exist for a long time, and direct treatment measures are urgently needed for the polluted river channels. Many urban river channels have been artificially transformed and built hard revetments. The self-purification ability of the river channel has been greatly weakened. Just like a patient with a lack of immunity is in urgent need of physical fitness, the self-purification ability of the river channel needs to be enhanced.

In summary, river channel pollution is inevitable. There are many methods to treat river channel pollution. Existing biological methods works slowly, while chemical methods have toxic and side effects, which often cause secondary pollution. Since the inflow of non-point source sewage in the river channel is inevitable, there is an urgent need to increase the self-purification capacity of the river channel to directly purify the river waters containing pollutants. The biological floating bed technology is complicated to process. Since the floating bed floats in the river channel, it needs to be fixed in the river channel. The floating bed occupies many areas of the river channel. It is inconvenient to construct and replace the floating bed, which is not conducive to the cleaning of the river channel and only the surface water of the river channel can be purified. Therefore, the "floating bed" technology is in urgent need of innovation.

To save land resources, most of the urban river channels use vertical revetments. For example, the central urban areas of Shanghai mostly use vertical retaining walls. The current situation shows that the revetment is more susceptible to be polluted. The concentration of pollutants near the revetment is often greater and more concentrated. The waters near the revetment are the most severely polluted areas, and water purification is more needed. Therefore, it is necessary to propose innovative technologies for water purification n according to the current conditions of the river channel.

SUMMARY

The present disclosure provides an urban river channel direct purification device to overcome the above-mentioned defects of the prior art.

The present disclosure provides an urban river channel direct purification device. The device includes a vertically arranged support wall panel, an upper tray and a lower tray arranged horizontally, an upper end of the support wall panel is connected with the upper tray, a lower end of the support wall panel is connected with the lower tray, the upper tray and the lower tray are respectively semi-circular, several filler biological walls are disposed between the upper tray and the lower tray, a top end of each filler biological wall is fixedly connected with the upper tray, a bottom end of each filler biological wall is fixedly connected with the lower tray, and the filler biological wall is arranged along a radial direction of the upper tray/lower tray.

Preferably, the filler biological wall includes a first biological wall and a second biological wall, a radial length of the first biological wall is greater than a radial length of the second biological wall, the first biological wall and the second biological wall are arranged in a staggered manner.

Preferably, the filler biological wall includes a filler grid frame including two pieces of grids, a filler layer for directly purifying water in the river channel is disposed between the two pieces of grids, an upper end and a lower end of the grid are respectively bent outward to form connecting portions, the connecting portion at the upper end of the grid is connected with the upper tray, and the connecting portion at the lower end of the grid is connected with the lower tray.

Preferably, a batten is disposed on the surface of the connecting portion to press the connecting portion, the batten is connected with the corresponding upper tray/lower tray through bolts.

Preferably, the filler layer includes two first adsorption layers made of a bamboo raft and a second adsorption layer disposed between the two first adsorption layers, the second adsorption layer is formed by stacking coal cinder bags.

Preferably, the bamboo raft is woven from bamboo sheets into a mesh structure, and is bound to the filler grid frame by an iron wire.

Preferably, the second adsorption layer has a thickness of about 200 mm.

Preferably, the outside of the filler grid frame is provided with a green wall formed by external green plants.

Preferably, first inclined supports are disposed on the support wall panel near the upper end of the support wall panel, an end of the first inclined support is connected to the bottom of the upper tray, a second inclined support is disposed on the support wall panel near the lower end of the support wall panel, the lower end of the second inclined support is connected to the lower tray.

Preferably, the rear side of the support wall panel is further provided with hooks near the upper end of the support wall panel.

Preferably, the urban river channel direct purification device is hung on the outside of a river channel retaining wall and placed in water.

As described above, the urban river channel direct purification device of the present disclosure has the following beneficial effects:

The device of the present disclosure is assembled from multiple components, and includes a support wall panel, hooks, trays, filler biological walls, and external green plants. The device of the present disclosure can be directly hung on the water-side of the vertical retaining wall of the urban river channel, and is in close contact with the water of the river channel, and directly purifies the water of the river channel through the adsorption material in the device. The aquatic plants on the outside of the filler biological walls can not only purify the water quality together with the biological walls, but also beautify the environment on both sides of the river channel, and combine the water purification and environmental beautification.

Figure 1:
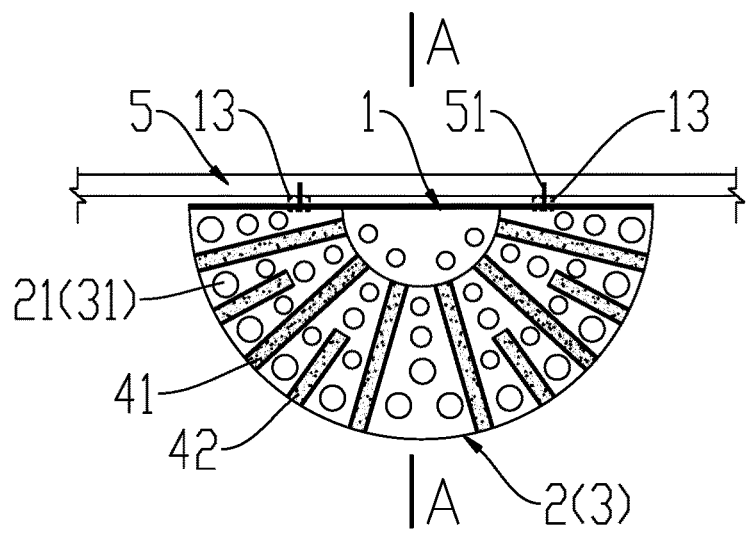
FIG. 1 shows a plane view of the device according to the present disclosure.

| Description of Reference Numerals | |
|---|---|
| 1 | Support wall panel |
| 11 | First inclined support |
| 12 | Second inclined support |
| 13 | Hook |
| 2 | Upper tray |
| 21 | Hole |
| 22 | Amphiphyte |
| 3 | Lower tray |
| 31 | Hole |
| 4 | Filler biological wall |
| 41 | First biological wall |
| 42 | Second biological wall |
| 43 | Grid |
| 431 | Connecting portion |
| 44 | Batten |
| 45 | Bolt |
| 461 | First adsorption layer |
| 462 | Second adsorption layer |
| 47 | External green plant |
| 5 | Retaining wall |
| 51 | Expansion bolt |

DETAILED DESCRIPTION OF THE PREFERRED EMBODIMENTS

The embodiments of the present disclosure will be described below. Those skilled may easily understand other advantages and effects of the present disclosure according to contents disclosed by the specification.

It should be understood that the structures, proportions, sizes, and the like, which are illustrated in the drawings of the present specification, are only used to clarify the contents disclosed in the specification for understanding and reading by those skilled, and are not intended to limit the implementation of the present disclosure, thus are not technically meaningful. Any modification of the structure, change of the scale, or adjustment of the size should still fall within the scope of the technical contents disclosed by the present disclosure without affecting the effects and achievable objectives of the present disclosure. In the meantime, the terms "upper", "lower", "left", "right", and "intermediate" as used in this specification are also for convenience of description, and are not intended to limit the scope of the present disclosure, and the change or adjustment of the relative relationship is considered to be within the scope of the present disclosure without substantial changes in technology.

Figure 2:
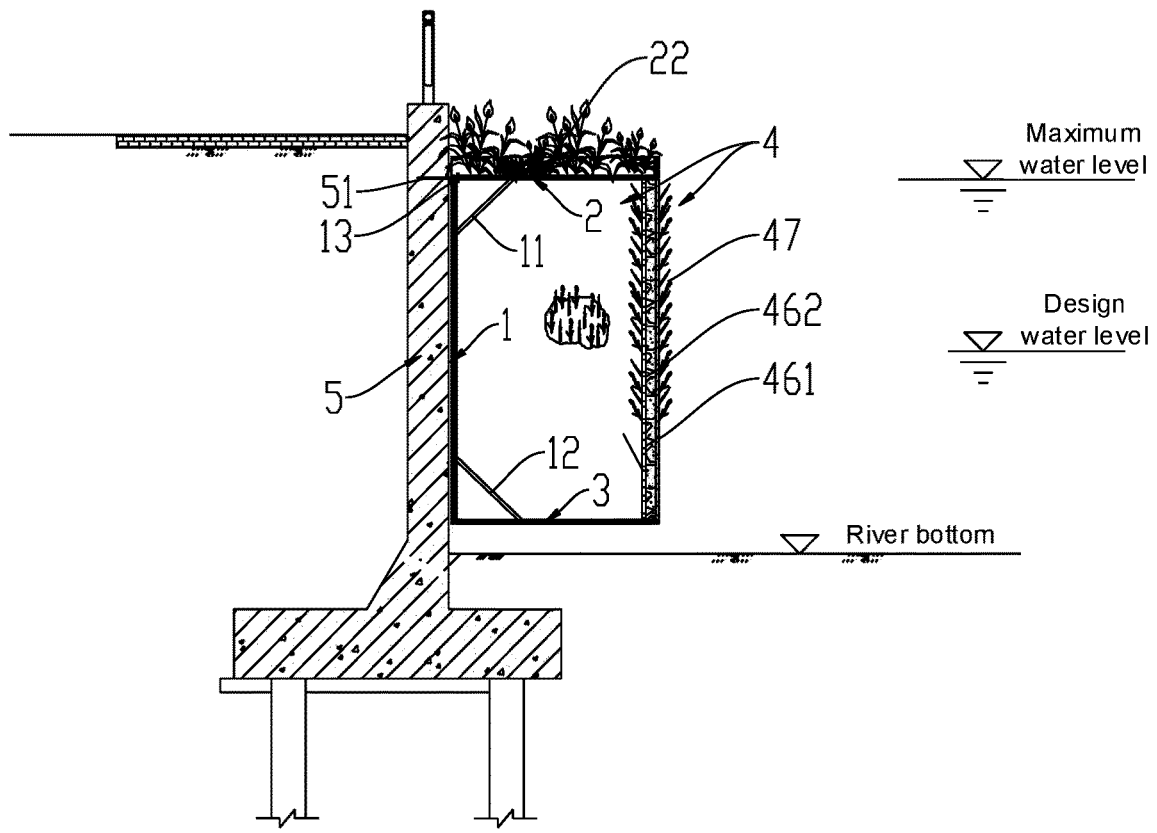
FIG. 2 shows a cross-sectional view along A-A in FIG. 1.
Figure 3:
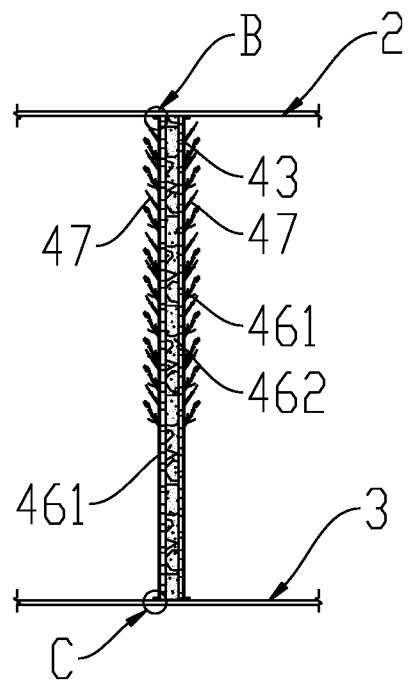
FIG. 3 shows a cross-sectional view of a filler biological wall.
Figure 4:
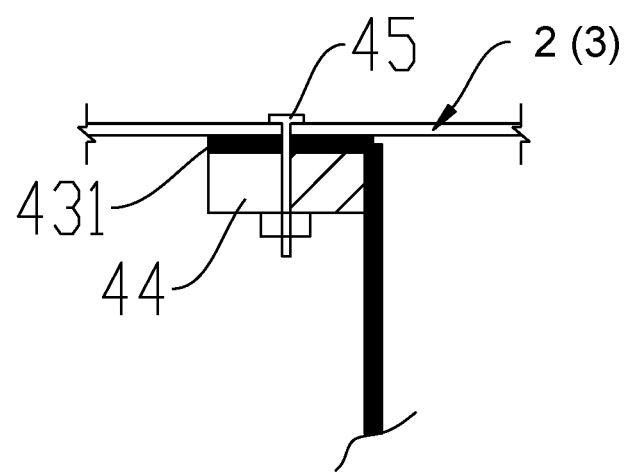
FIG. 4 shows an enlarged view at B in FIG. 3.
Figure 5:
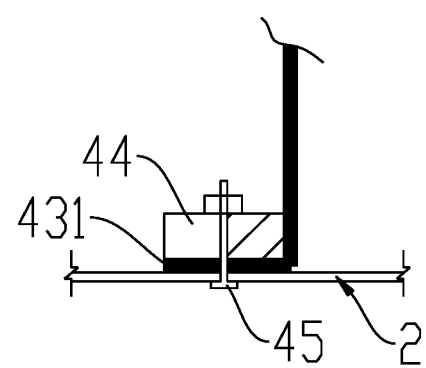
FIG. 5 shows an enlarged view at C in FIG. 3.

As shown in FIGS. 1 to 3, the present disclosure provides an urban river channel direct purification device, which has a semi-circular frame structure. The device includes a vertically arranged support wall panel 1, an upper tray 2 and a lower tray 3 arranged horizontally. The upper tray 2 and the lower tray 3 are respectively semi-circular, the upper tray 2 is connected to the upper end of the support wall panel 1, the lower tray 3 is connected to the lower end of the support wall panel 1, and the straight edges of the upper tray 2 and the lower tray 3 are connected to the support wall panel 1 at right angles. The right-angle intersections of the support wall panel 1 and the upper tray 2, the lower tray 3 can be hinged. Several holes 21 and 31 are evenly arranged on the upper tray 2 and the lower tray 3. There are also several filler biological walls 4 between the upper tray 2 and the lower tray 3. The top end of each filler biological wall 4 is fixedly connected to the upper tray 2, and the bottom end of each filler biological wall 4 is fixedly connected to the lower tray 3, the filler biological wall 4 is arranged along the radial direction of the upper tray 2/lower tray 3.

Potted green plants or amphibious plants 22 are arranged in the upper tray 2, which can not only beautify the environment, but also block the purification components below. The lower tray 3 mainly supports the bottom end of the filler biological wall 4, the lower tray 3 includes evenly holes 31 outside the biological wall. The upper tray 2 and the lower tray 3 have the same radius, which is set as required and generally ranges from 1.2 to 1.5 m. Circular holes 21 are arranged on the upper tray 2 and circular holes 31 are arranged on the lower tray 3 to reduce buoyancy and facilitate the mutual communication of water bodies. The upper tray 2 and the lower tray 3 have the same size and shape, which is convenient for standardized production and installation. The width of the support wall panel 1 is equal to the diameter of the upper tray 2/lower tray 3, and the height of the support wall panel 1 is equal to the height from the mud surface of the revetment to the design high water level. The support wall panel 1 is a whole board, or it can be empty in the middle. The support wall panel 1 may be partially thickened or adopt other structural measures according to strength requirements.

As shown in FIGS. 1 to 3, preferably, the filler biological wall 4 includes a first biological wall 41 and a second biological wall 42. The radial length of the first biological wall 41 is greater than the radial length of the second biological wall 42. The first biological wall 41 and the second biological wall 42 are staggered, this arrangement is conducive to saving layout space and can maximize the purification of water quality.

As shown in FIGS. 2 to 5, preferably, the filler biological wall 4 includes a filler grid frame, and the filler grid frame includes two pieces of grids 43. A filler layer is disposed between the two pieces of grids 43. The filler grid frame is the carrier of the adsorbent material and includes two pieces of galvanized metal grids. The spacing between the two pieces of grids is determined according to the needs of the filler, which is generally about 300 mm. The height of the grid is the distance between the two trays. The width of the grid is set according to the radius of the tray. The filler grid frame needs to have a certain strength to support the upper tray 2. When the cinder bag is used as the filler alone, the grid size is determined by the size of the bag filling material to ensure that the bag is not leaking and the force is reasonable. Filler grid frames in the same row have the same size and shape, and have the same installation method, which facilitates standardized production and installation. The upper and lower ends of the grid 43 are bent outward at 90 degrees to form a connecting portion 431, and the upper connecting portion 431 of the grid 43 is fixedly connected to the upper tray 2. The lower connecting portion 431 of the grid 43 is fixedly connected to the lower tray 3. The connecting portion 431 is a right-angled side with a length of 50 mm. A batten 44 is disposed on the surface of the connecting portion 431 to press the connecting portion 431. The batten 44 is connected with the corresponding upper tray 2/lower tray 3 through bolts 45. Generally, when the trays have a big diameter, two rows of battens 44 are used for each tray, and the radial lengths of battens 44 in the same row are the same. When the trays have a small diameter, a row of batten 44 is used for each tray.

As shown in FIGS. 2 and 3, preferably, the adsorbent of the filler layer includes bamboo sheets and coal cinder. The adsorbent can be set as required, and it can be one material, such as a coal cinder, or more than one layer of two different materials. Generally, the adsorbent can be divided into three layers according to needs, which includes first adsorption layers 461 made of bamboo rafts on both sides. The bamboo raft is woven into a mesh structure from bamboo sheets, and the mesh can be large or small. Generally, a conventional bamboo raft can be used, and the bamboo raft is bound to the filler grid frame by an iron wire, which generally has 2 to 5 binding points.

A second adsorption layer 462 is disposed between the first adsorption layers 461 on both sides. The middle layer is the main adsorption decontamination layer, which uses coal cinder for adsorbing the pollutant. The thickness of the second adsorption layer 462 is generally greater than 200 mm. Coal cinder is packed in bags to form coal cinder bags. The coal cinder bags are stacked in a cavity formed by bamboo rafts of the grid frame, and their function is to adsorb harmful substances in water. The bags used to store the adsorbent coal cinder are permeable materials, which can use geotextiles or geogrids, and the mesh size of the bags should be smaller than the particle diameter of the adsorbent. The use of bags is convenient for construction and replacement. The size of the bags is suitable for one person to carry after loading. Generally, after one year of running the device, the filler has already saturated with adsorbed harmful substances. The device is lifted, the bags are pulled out of the empty space of the wall from the grid frame, and the adsorbent is replaced. The outer bamboo raft can not only degrade harmful substances in the river, but also provide space for the growth and reproduction of microorganisms in the river, and promote the degradation of pollutants in the water of the river. The bamboo raft, coal cinder bag, batten, bolt, etc. that constitute the biological wall have the same size and shape, which is convenient for standardized production and installation.

As shown in FIGS. 2 and 3, preferably, the outside of the filler grid frame is also provided with a green wall formed by the external green plants 47, the height of the green wall can generally be equal to the height from the design low water level to the top of the wall. The function of the green wall is to purify the water of the river and beautify the purification device. The water of the river is purified through the absorption of nutrients by the aquatic plants, the shading of the crown of the plants, and the killing effect of the secretions from the root zone on the algae. Flower pots can be hung separately on the grid frame to facilitate the installation and replacement of adsorbent materials. Green plants such as amphiphyte 22 are disposed on the top surface of the upper tray to increase the overall landscape effect of the device. The purification of aquatic plants mainly includes the absorption of aquatic plants, microbial metabolism, and adsorption and precipitation in the root environment of plants.

As shown in FIGS. 2 and 3, preferably, when the upper tray 2 has a large load, several first inclined supports 11 are disposed on the support wall panel 1 near the upper end of the support wall panel 1. An end of the first inclined support 11 is connected to the bottom of the upper tray 2 to transfer the load on the upper tray 2. The two ends of the first inclined support 11 can be hinged with the support wall panel 1 and the upper tray 2 for easy disassembly and storage. When the lower tray 3 is under a large load, a second inclined support 12 is disposed on the support wall panel 1 near the lower end of the support wall panel 1. The lower end of the second inclined support 12 is connected to the lower tray 3 between the filler biological walls 4. Several second inclined supports 12 are arranged symmetrically. The second inclined support ties the lower tray and the support wall panel to transfer the load on the lower tray 3. The two ends of the second inclined support 12 can be hinged with the support wall panel 1 and the lower tray 3 for easy disassembly and storage.

As shown in FIGS. 1 to 5, preferably, the rear side of the support wall panel 1 is further provided with hooks 13 near the upper end of the support wall panel 1. Two holes are symmetrically disposed on the top of the support wall panel 1 for the hooks 13. The hooks 13 are used to hang the device of the present disclosure on the retaining wall 5. An expansion bolt 51 is disposed outside the retaining wall 5, so that the hook 13 can be hung on the expansion bolt 51. For the stability of the device, generally, no less than 2 hooks are disposed on the upper end of a wall panel, the number of the hooks is determined according to the suspended load. The device of the present disclosure is hung on the outside of the retaining wall, the back of the device is flat against the wall, and the wall is used as a support.

The device of the present disclosure should meet the strength requirements. Since the filler biological wall material is light in weight and has the effect of water buoyancy, the general plastic is sufficient to meet the requirements. The trays, wall panel, grid frame, hooks, bamboo rafts and coal cinder bags are all standard components, which are versatile, so they are easy for the factory to make and easy for on-site installation.

The coal cinder used in the present disclosure is a porous material, which has an enlarged structure, honeycomb pores, is insoluble in water, can be used as an adsorption material after screening and washing, and can filter out particulate materials that are visible to eyes. The coal cinder has a good effect on the separation of odor, suspended matter and color-developing substances in water, and is an inexpensive adsorption material.

The coal cinder is used for purification of river water quality. The comprehensive utilization of coal cinder greatly reduces the generation amount of solid waste, saves the area of solid waste, and avoids many pollution problems caused by it. Using large amounts of coal cinder is the reuse of waste, which saves resources and energy, and creates economic value.

The bamboo raft used in the present disclosure is made of natural ecological materials, has a biological affinity, rough surface, and large specific surface area. Bamboo is rich in resources, and the cost of bamboo is low. Bamboo is renewable, environmental pollution is low, and bamboo can degrade itself. Bamboo is a natural material with good biological affinity and is a material with application potential. At present, the new bamboo fiber biofilm carrier prepared from bamboo fiber as a raw material has a stable effect on water treatment. Bamboo tube is split into pieces in a longitudinal direction, woven into a mesh, and placed vertically in the grid frame of the biological wall.

Relevant tests show that the removal rate of bamboo rafts to COD is 74%, the removal rate to NO3-N is 95%, and the removal rate to TP reaches 37%, which has an obvious effect on improving the purification ability of river water quality. The content of microbial phospholipids and dehydrogenase activity attached to the surface of the bamboo sheet is large, which can provide space for the growth and reproduction of the microorganisms, and can continuously promote the degradation of pollutants in the river channel.

The present disclosure adopts the direct purification technology of the river channel. The direct purification refers to that some purification measures are taken directly in the river bed to treat on the spot. For organic polluted river channels, the river bed itself is used as a treatment tank, the technical conditions for the physical sewage treatment are created, and the physical method is used to purify the water quality directly in the river bed itself.

The device of the present disclosure hangs on the outside of the retaining wall on both sides of the river channel, and the river water immerses the biological walls of the device. The filler wall provides a place for microorganisms to attach, which forms a biofilm on the surface of the filler wall. As a carrier, the filler plays an extremely important role in the attachment and growth and contact oxidation of microorganisms. Under the action of the metabolism of microorganisms on the biofilm, the organic pollutants in the river water are removed and the sewage is purified.

The biological wall of the device adopts a bamboo raft and coal cinder. After a period of use, the pollutants will cover the wall of the device. The wall will be lifted and placed on the empty ground to dry. After manual knocking or mechanical vibration to remove contaminants, the biological wall can be used again.

The device of the present disclosure is hung on the retaining wall of the river channel, the outside of the retaining wall can be hung with aquatic plants, and the top surface of the retaining wall is provided with an ecological floating bed to plant aquatic plants, thereby forming a single water purification device as a whole into a green island. Along the banks of the river, semi-circular flower beds and vertical green plants of biological walls form a semi-circular island of plants, which can not only add beauty to the river, but also purify the water quality of the river.

The advantage of the technology of the present disclosure is that the long-term benefit is obvious. The adsorption material in the ecological wall of the device can achieve reuse of waste, the maintenance and replacement are convenient, the cost is low, and there is no energy consumption during operation, which can not only adsorb the sewage and reduce the pollution of the sewage of the river, but also adsorb harmful substances. It can purify river water for a long time, and can maintain the diversity of river biological.

The direct purification technology of the present disclosure plays a role in stabilizing the immune system of the river channel for intercepting sewage, dredging or remediation of the water system, can greatly enhance the self-purification ability of the river channel, eliminate odors, adsorb harmful substances in the water, and prevent repeated pollution. For a large number of untreated pollution rivers, it can continuously purify water at a low cost. For some rivers where the proportion of sewage is not too high, especially in non-point source pollution areas such as small towns and villages, there is no need to even intercept sewage to build sewage treatment plants. After entering the river, the sewage can be directly treated in the river, which can greatly reduce pollution control costs. Therefore, direct purification technology is a very vital frontier technology in the field of river water quality control. The present disclosure provides an innovative technology that responds to this requirement. It adopts a new process and technology for directly purifying river water using engineering technology. The device is simple, the manufacturing cost is low, and the filler biological wall can be reused.

As mentioned above, the present disclosure effectively overcomes various shortcomings in the existing technology and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

We claim:

1. An urban river channel direct purification device, comprising a support wall panel (1) arranged vertically, an upper tray (2) and a lower tray (3) arranged horizontally, an upper end of the support wall panel (1) is connected with the upper tray (2), a lower end of the support wall panel (1) is connected with the lower tray (3), the upper tray (2) and the lower tray (3) are respectively semi-circular, a plurality of filler biological walls (4) is disposed between the upper tray (2) and the lower tray (3), a top end of each filler biological wall (4) is fixedly connected with the upper tray (2), a bottom end of each filler biological wall (4) is fixedly connected with the lower tray (3), and the plurality of filler biological walls (4) is arranged along a radial direction of the upper tray (2) or the lower tray (3); wherein each filler biological wall (4) comprises a filler grid frame including two pieces of grids (43), wherein a filler layer for directly purifying water in the river channel is disposed between the two pieces of grids (43), an upper end and a lower end of each of the grids (43) are respectively bent outward to form connecting portions (431), the connecting portion (431) at the upper end of each of the grids (43) are connected with the upper tray (2), and the connecting portion (431) at the lower end of each of the grids (43) is connected with the lower tray (3).

2. The urban river channel direct purification device according to claim 1, wherein each filler biological wall (4) comprises a first biological wall (41) and a second biological wall (42), a radial length of the first biological wall (41) is greater than a radial length of the second biological wall (42), the first biological wall (41) and the second biological wall (42) are arranged in a staggered manner.

3. The urban river channel direct purification device according to claim 1, wherein the filler layer comprises two first adsorption layers (461), each made of a bamboo raft, and a second adsorption layer (462) disposed between the two first adsorption layers (461), wherein the second adsorption layer (462) is formed by stacking bags of coal cinders.

4. The urban river channel direct purification device according to claim 3, wherein the bamboo raft is woven from bamboo sheets into a mesh structure, and is bound to the filler grid frame by an iron wire.

* * * * *